United States Patent
Böhm et al.

(10) Patent No.: US 7,306,072 B2
(45) Date of Patent: Dec. 11, 2007

(54) HYDRAULIC POWER-ASSISTED STEERING SYSTEM

(75) Inventors: Jürgen Böhm, Oberneisen (DE); Steffen Linkenbach, Eschborn (DE)

(73) Assignee: Continental Teves AG & OHG, Frankfurt (DE)

( * ) Notice: Subject to any disclaimer, the term of this patent is extended or adjusted under 35 U.S.C. 154(b) by 290 days.

(21) Appl. No.: 10/519,830

(22) PCT Filed: Jul. 4, 2003

(86) PCT No.: PCT/EP03/07170

§ 371 (c)(1),
(2), (4) Date: Dec. 28, 2004

(87) PCT Pub. No.: WO2004/005112

PCT Pub. Date: Jan. 15, 2004

(65) Prior Publication Data
US 2005/0257987 A1 Nov. 24, 2005

(30) Foreign Application Priority Data
Jul. 5, 2002 (DE) .............................. 102 30 264

(51) Int. Cl.
B62D 5/04 (2006.01)
B62D 5/06 (2006.01)

(52) U.S. Cl. ...................................... 180/446; 180/422
(58) Field of Classification Search ................ 180/405, 180/407, 421, 422, 434, 443, 446

See application file for complete search history.

(56) References Cited

U.S. PATENT DOCUMENTS

| 4,574,905 A | | 3/1986 | Asano et al. |
| 6,134,490 A | * | 10/2000 | Ito et al. ........................ 701/42 |
| 6,298,940 B1 | * | 10/2001 | Bohner et al. .............. 180/403 |
| 2003/0150665 A1 | * | 8/2003 | Weeber et al. .............. 180/421 |

FOREIGN PATENT DOCUMENTS

| DE | 199 11 892 A1 | 9/2000 |
| EP | 1 142 746 A2 | 10/2001 |
| WO | WO 01/70555 A1 | 9/2001 |

* cited by examiner

*Primary Examiner*—Kevin Hurley
(74) *Attorney, Agent, or Firm*—Ratner Prestia

(57) ABSTRACT

The invention relates to a hydraulic power-assisted steering system comprising a steering gear and a hydraulic actuator for assisting actuation of the steering wheel by the driver of a vehicle, in particular a motor vehicle, comprising an electric motor which is coupled to the steering column and used as an additional torque actuator for actively applying an additional steering torque, also consisting of an electronic control and regulating unit (ECU), which includes a determination unit for determining a steering torque and an evaluating and selecting circuit, by means of which a total value for applying the additional steering torque is determined in consideration of the determined steering torque or a quantity derived therefrom and a selected basic characteristic curve of steering (basic characteristic curve), with the total value of the additional steering torque to be applied including a driver-dependent component and a driver-independent component.

13 Claims, 9 Drawing Sheets

HYDRAULIC POWER-ASSISTED STEERING SYSTEM

TECHNICAL FIELD

The present invention relates to a hydraulic power-assisted steering system comprising a steering gear and a hydraulic actuator for assisting actuation of the steering wheel by the driver of a vehicle, in particular a motor vehicle, comprising an electric motor which is coupled to the steering column and used as an additional torque actuator for actively applying an additional steering torque, also consisting of an electronic control and regulating unit (ECU).

The invention also relates to a method for controlling a hydraulic power-assisted steering system, wherein the actuation of the steering wheel by the driver of a vehicle, in particular a motor vehicle, is assisted by a hydraulic force or pressure, and wherein an electric motor which is coupled to the steering column is used as an additional torque actuator for actively applying an additional steering torque by way of an electronic control or regulation of the electric motor.

BACKGROUND OF THE INVENTION

Up-to-date motor vehicles, in particular passenger vehicles, are generally equipped with hydraulic or electrohydraulic power-assisted steering systems, hereinbelow referred to as 'hydraulic servo steering systems'. The servo assistance is devised such that actuators, e.g. hydraulic cylinders, are arranged in the mid-portion of the steering mechanism. A force generated by the actuators assists in the actuation of the steering mechanism in response to the turning of the steering wheel (torque assistance). This reduces the torque that must be generated for steering the vehicle, and the driver is relieved in the steering activity.

It is known in the art to devise the torque assistance or the boosting of the steering system in response to speed. At low vehicle speeds as they are typical of pulling in or out of a parking space, easy-running steering with a high torque assistance is preferred, while heavy steering with a lower torque assistance is desirable when driving fast.

BRIEF SUMMARY OF THE INVENTION

An object of the invention is to devise a hydraulic power-assisted steering system, which allows the provision of variable torque assistance and is easy to integrate into already existing hydraulic power-assisted steering systems.

This object is achieved by means of the features of the independent claims. Dependent claims are directed to preferred embodiments of the invention.

The term 'steering wheel' herein means all possible actuating devices for steering a vehicle such as a steering wheel or a joystick.

The essence of the invention is that the electronic control and regulating unit (ECU) includes a determination unit for determining a steering torque and an evaluating and selecting circuit, by means of which a total value for applying the additional steering torque is determined in consideration of the determined steering torque or a quantity derived therefrom and a selected basic characteristic curve of steering (basic characteristic curve), and the total value of the additional steering torque to be applied includes a driver-dependent component and a driver-independent component.

Consequently, the additional steering torque includes a principally driver-dependent component that corresponds to a basic steering function, in particular a driving-speed-responsive steering assistance, e.g. steering defined by parameters. A principally driver-independent component is provided as another component and used to realize driver assist functions. The latter means e.g. systems for the tracking stability of the vehicle (lane keeping) or for assistance in highly dynamic roadway situations, e.g. according to a driving dynamics system (ESP system).

The invention arranges that different predetermined characteristic curves can be selected for varying the application of the additional steering torque.

According to the invention, the characteristic curve represents a characteristic curve of amplification conveying the additional steering torque to be applied in dependence on the steering torque applied by the driver and on an amplification factor.

It is provided by the invention that different predetermined characteristic curves for the variation of the application of the additional steering torque can be selected by way of a control variable ST, which is directly or indirectly predefinable by the driver.

According to the invention, the electronic control and regulating unit (ECU) is designed redundantly.

According to the invention, the electric motor is coupled to the steering column by way of a gear, preferably a belt drive.

According to the invention, the amplification factors of the different characteristic curves are variable in response to the vehicle speed.

According to the invention, a steering recommendation is given to the driver by means of the driver-independent component.

It is provided according to the invention that the vehicle is stabilized and the vehicle dynamics is enhanced, respectively, by means of the driver-independent component.

This embodiment is especially preferred because comfort and safety in highly dynamic or safety-critical driving situations can be enhanced significantly by considering quantities related to driving dynamics according to the invention.

It is arranged according to the invention that the additional steering torque is adapted to a vehicle course and a roadway course by means of the driver-independent component.

It is provided by the invention that the variations of the additional steering torque are achieved by using a scaling factor $\lambda$ or an amplification factor V (where $V=1/\lambda$).

Preferably, the scaling factor $\lambda$ or amplification factor V (where $V=1/\lambda$) is limited to a predefined value in a torque-dependent fashion. This means that a limitation is introduced, in particular according to the ratio between a steering torque that is maximally applicable by the driver and a steering torque to be actually applied by the driver in order that boosting of the steering activity in total will not fall below a defined value.

It is provided by the invention that the means for the active application of the additional steering torque are designed as a unit that is arranged as a module at a steering-wheel-side end portion of the steering valve of a hydraulic power-assisted steering system.

The object is also achieved by a method characterized in that a total value of the additional steering torque is determined from a driver-dependent component and a driver-independent component in consideration of the additional steering torque or a quantity derived therefrom and a preselected basic characteristic curve of steering (characteristic curve).

Preferably, a variation of the application of the additional steering torque is executed in said method by way of selecting a characteristic curve from several different predetermined characteristic curves.

DETAILED DESCRIPTION OF THE PREFERRED EMBODIMENTS

Figure 1:
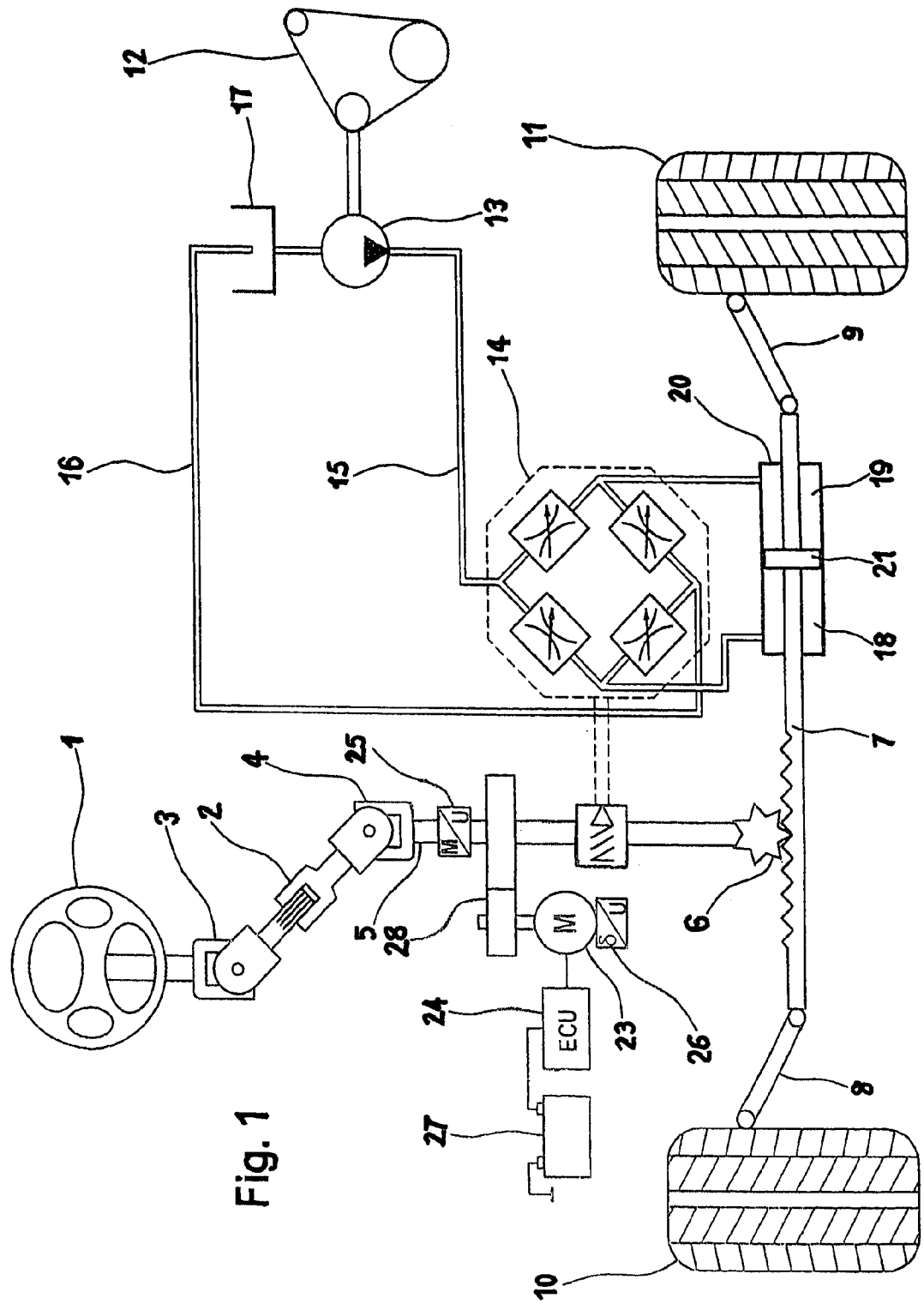
FIG. 1 is a schematic view of an embodiment of the power-assisted steering system according to the invention comprising an electromechanical actuator.

The steering system illustrated in FIG. 1 is composed of a steering wheel 1, a steering column 2 with two universal joints 3, 4 connected to the steering wheel 1. The steering column 2 is connected to or part of a steering wheel shaft 5, hereinbelow also referred to as 'torsion rod' which actuates steering tie rods 8, 9 secured to the steering rack 7 by way of a steering gear 6, a steering rack 7, herein designed a steering rack 7, and thereby causes turning of the wheels 10, 11. In the steering-rack steering system shown herein, hydraulic assistance is realized by means of a hydraulic pump 13 driven by the driving motor of the vehicle, e.g. by way of a belt drive 12, said pump supplying pressurized fluid to a steering valve 14 through a conduit 15. The pressure fluid can flow back into a supply reservoir 17 through a return line 16. When the steering wheel adopts a straight position, a constant oil flow returns through the steering valve being in its neutral position (open center) and through the return line 16. The pressure in two chambers 18, 19 of a working cylinder 20 arranged at the steering rack 7 will then have an equal amount. No steering assistance is executed. The steering rack 7 and, thus, also piston 21 is displaced when the steering wheel 1 is turned. The pressure of the pressure fluid assists the movement of piston 21. As this occurs, valve 14 simultaneously causes pressure fluid to propagate from one chamber into the other chamber so that hydraulic assistance is imparted to the steering actuation in total.

For producing an additional torque, this conventional hydraulic power-assisted steering system described hereinabove includes an electric motor 23, a redundant control unit ECU 24 for actuating the motor 23 and for evaluating signals of a redundant steering torque sensor 25. Preferably, a sensor for the position of the motor 26 is also provided. The electronic components are connected to an electric energy source 27. The control unit ECU 24 and the torque sensor preferably have a redundant design.

The steering wheel torque or steering torque, which is defined by the steering system characteristics and the forces acting can be influenced actively by the E-motor 23 because said motor produces an additional torque (additional steering torque) and applies it to the steering rod. It is possible to add the torque to the constructively predetermined steering wheel torque or to deduct it therefrom. The motor torque can be transmitted with or without rear ratio, directly or by way of a gear 28, as illustrated herein. A belt drive, a helical gear/worm gear, or a spur gear system can be used to this end.

Upon failure of the E-motor 23 and/or the control unit ECU 24, the steering characteristics with servo assistance known to the driver is maintained. E-motor 23 and control unit ECU 24 are fail-silent for this purpose. This means that these components are disconnected in a case of malfunction.

Advantageously, a conventional power-assisted steering system can be used without modifications to the characteristics by means of the system for producing an additional torque.

Figure 2:
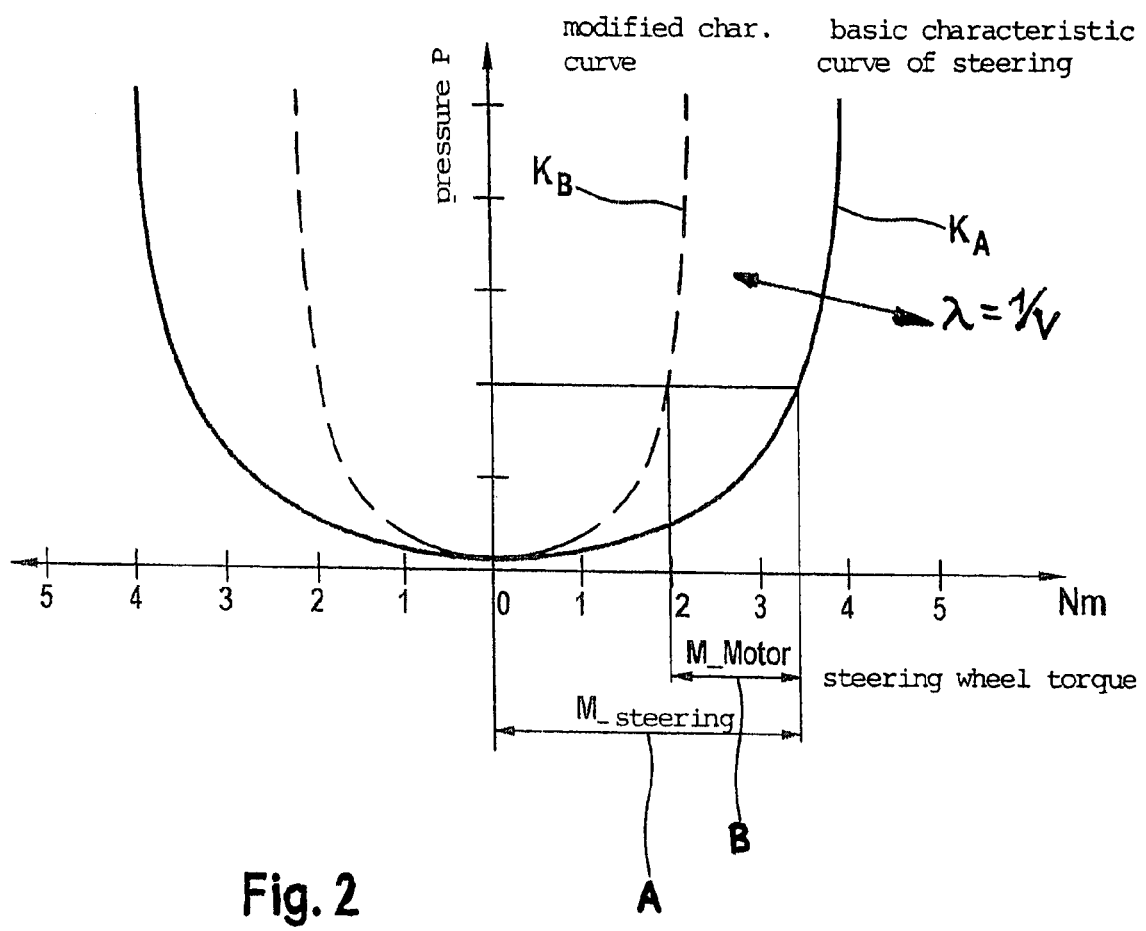
FIG. 2 is a basic characteristic curve of a power-assisted steering system and a modified characteristic curve.

The invention renders it possible to vary the boosting characteristic curve by producing an additional torque (see FIG. 2). The characteristic curve of amplification herein means the dependency of the steering wheel torque or actuating torque M on the existing system pressure P of the hydraulic assistance. The variations of the additional steering torque are preferably effected by an amplification factor V or scaling factor $\lambda$, and $V=1/\lambda$ applies. The torque A (M_steering) is reduced by actively applying an additional torque B (M_motor) in the embodiment shown. This means that the driver is more significantly assisted in his/her steering activity. The result is a modified characteristic curve (dotted curve $K_B$) with a lower actuating force compared to the original characteristic curve (solid curve $K_A$). Active driver assistance can be realized by this variation of the characteristic curve. A steering recommendation is given by the torque variation.

Figure 3:
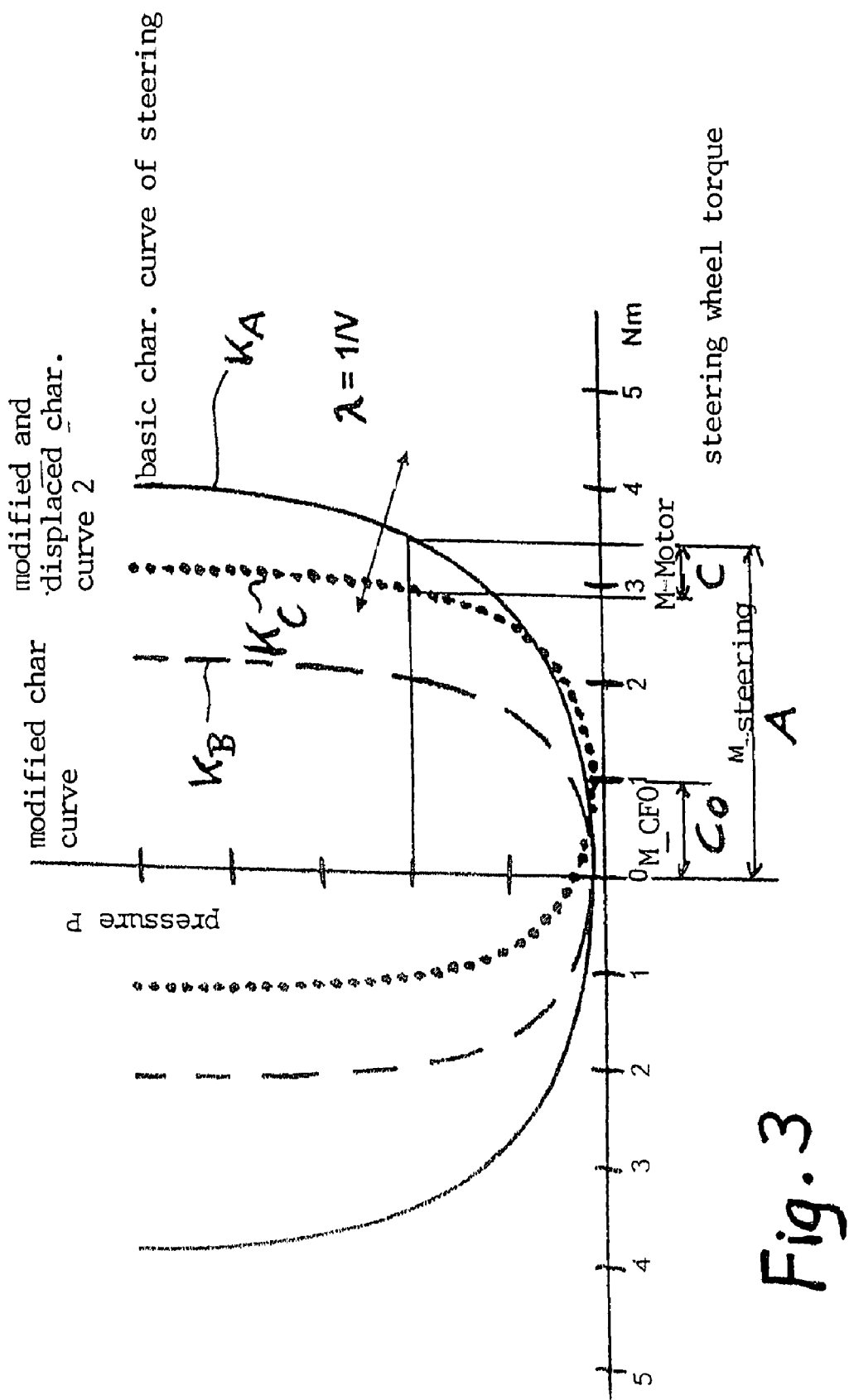
FIG. 3 depicts a basic characteristic curve of a power-assisted steering system and a modified characteristic curve with a center displacement.

In addition, active driver assistance is realized in a particularly favorable manner by way of a displacement of the central point of a characteristic curve (center displacement), e.g. the characteristic curve $K_A$ or $K_B$. FIG. 3 depicts how a center displacement is executed in addition to a torque variation shown in FIG. 2. Similarly to FIG. 2, the torque A (M_steering) is reduced by the active application of the additional torque C (M_motor). The resulting characteristic curve $K_C$ (dotted curve in FIG. 3) with a lower actuating force compared to the original characteristic curve (solid curve $K_A$) herein corresponds to the modified characteristic curve $K_B$ as shown in FIG. 2 (dotted curve in FIG. 3 and FIG. 2) with an additional displacement of the center M_CF, 0. This imparts a stronger assistance to the steering activity of the driver in a certain direction giving an indication in which direction the driver shall steer. The steering recommendation to the driver, as to in which direction he/she shall steer, can be given especially favorably with this system.

Figure 4A:
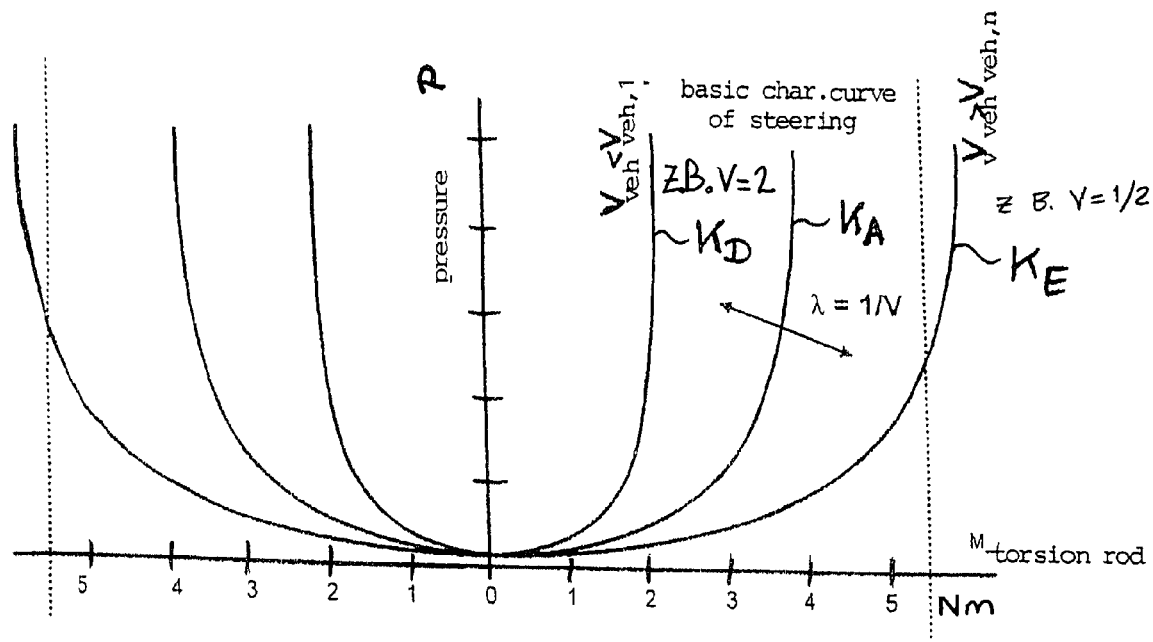
FIG. 4a illustrates a basic characteristic curve of a power-assisted steering system and two characteristic curves modified in accordance with the vehicle speed by means of an amplification factor V.

It is shown in FIG. 4a how a basic characteristic curve $K_A$ is varied in accordance with the vehicle speed $V_{veh}$. In the embodiment shown, the basic characteristic curve $K_A$ is modified by an amplification factor V (1/λ) greater than 1, herein e.g. a factor 2, at a lower vehicle speed $V_{veh}$ when the vehicle speed is below a first limit value $V_{veh,1}$, i.e. when $V_{veh} < V_{veh,1}$ applies. The result is a modified speed-corrected characteristic curve (characteristic curve $K_D$ in FIG. 4a). On the other hand, the basic characteristic curve $K_A$ is modified by an amplification factor V (1/λ) smaller than 1, herein e.g. a factor ½, at a higher vehicle speed $V_{veh}$, when the vehicle speed is above a second limit value $V_{veh,n}$, i.e. when $V_{veh} > V_{veh,n}$. The result is a modified, speed-corrected characteristic curve (characteristic curve $K_E$ in FIG. 4a).

Figure 4B:
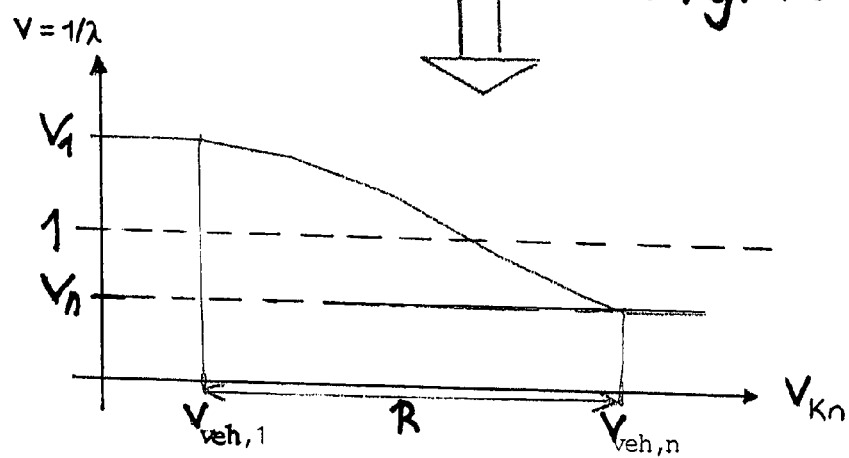
FIG. 4b depicts a dependency of the amplification factor V in accordance with the vehicle speed.

The variation of the amplification factor V (1/λ) in accordance with speed is shown in FIG. 4b. Up to the first limit value of the vehicle speed $V_{veh,1}$ the amplification factor V remains at a first, higher value $V_1$, herein e.g. a factor 2. It will then decrease continuously at rising vehicle speed $V_{veh}$ (control range R) and reach a second, lower value $V_n$, herein e.g. a factor ½, starting from the second limit value of the vehicle speed $V_{veh,n}$, e.g. when $V_{veh} > V_{veh,n}$ applies.

Figure 5:
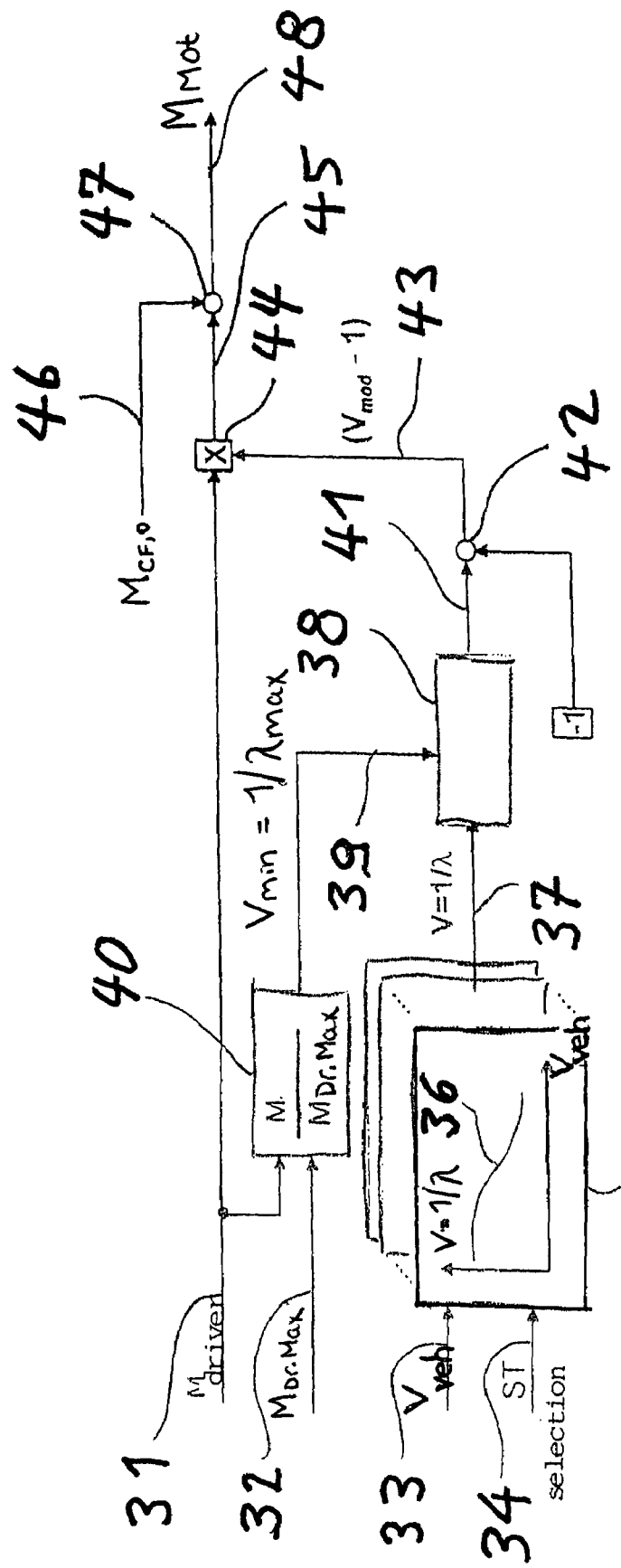
FIG. 5 illustrates an embodiment for determining a superposition torque for actuating the electric motor of the power-assisted steering system according to the invention.

In the embodiment of the actuation of the electric motor of the power-assisted steering system of the invention as shown in FIG. 5, the steering wheel torque of the driver is sensed by means of a torque sensor.

A variation of the steering assistance can take place e.g. in dependence on the vehicle speed (similar to steering defined by parameters), as is shown in FIGS. 4a and 4b. The variation is preferably executed by way of the amplification factor V according to the invention. However, other calculation rules are also feasible.

Input quantities for the determination are a torque $M_{driver}$ 31 to be applied by the driver, a torque $M_{Dr,max}$ 32 maximally applicable by the driver, the vehicle speed $V_{veh}$ 33, and a control variable ST 34 predefinable directly or indirectly by the driver. Different characteristic curves and possible variations can favorably be selected by means of the control variable ST 34.

In accordance with the vehicle speed $V_{veh}$ 33 and the control variable ST 34, an amplification factor V 37 is determined in a determination unit 35, preferably according to a predetermined or predeterminable function 36.

A limiter function 38 is used in the amplification factor V, corresponding to 1/λ, to take into account also a minimum value for the amplification factor V 39, which results 40 from the ratio between the torque $M_{driver}$ 31 to be applied by the driver and the torque $M_{Dr,max}$ 32 that is maximally applicable by the driver. This torque-dependent limitation of the amplification factor V prevents that the torque $M_{Dr,max}$ 32 to be applied by the driver rises excessively and, as the case may be, uncontrolledly when the steering assistance is reduced, at an amplification factor V lower than 'one' (V<1).

For standardization purposes, the value 'one' is deducted (V−1) 42 from the so determined amplification factor V 41, and the modified amplification factor ($V_{mod}$−1) 43 reduced by 'one' is superimposed 44 on the torque $M_{driver}$ 31 to be applied by the driver. With respect to this superimposed torque 45, a variable torque $M_{CF,0}$ 46 is additionally taken into account 47, as the case may be, especially for the purpose of center displacement. Advantageously, torque interventions independent of the driver are favorably taken into account by the variable torque $M_{CF,0}$, with the result of a displacement of the basic characteristic curve of steering. Active driver assistance on a torque basis can be realized this way. Said driver assistance acts in the sense of a steering recommendation for the driver by way of a higher-ranking control system (not shown). On the other hand, steering in one direction can be impaired by a torque increase. In the case of a steering recommendation for the driver, the additional torque $M_{CF,0}$ 46 is increased by a defined delta torque in the direction of the target course until the steering angle (corresponds to the target course of the vehicle) calculated by the higher ranking control system has been adjusted by the driver (center displacement). When the driver ignores the steering recommendation by not following the desired specifications, the additional torques $M_{CF,0}$ 46 calculated on the basis of the steering recommendation will be reduced slowly again, that means, gradually to the value 'zero' ($M_{CF,0}$ =0). An appropriate specification of the additional torque renders it possible to warn of critical driving situations.

A resulting motor torque $M_{Mot}$ 48 is produced as an output quantity.

Figure 6:
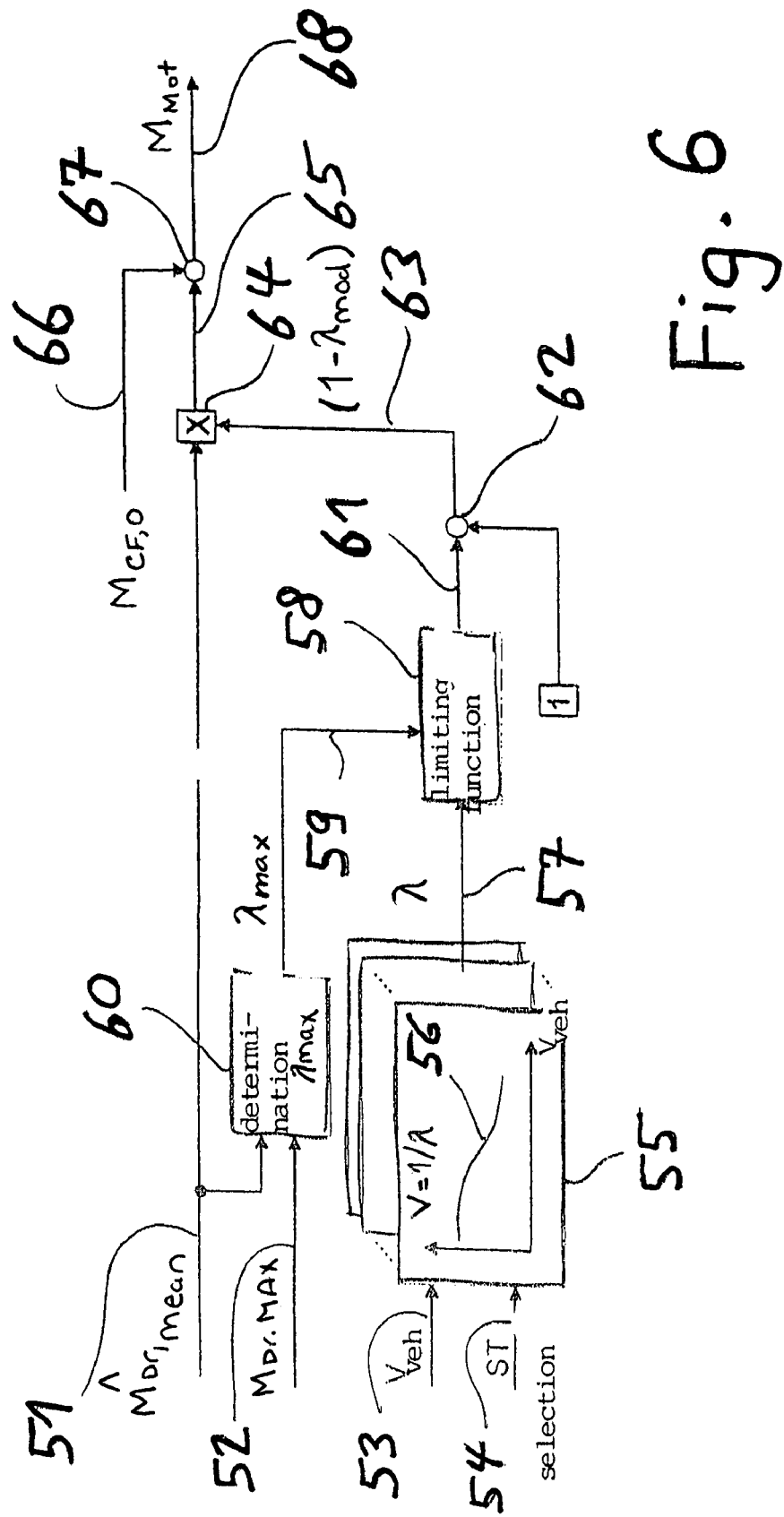
FIG. 6 shows another embodiment for determining a superposition torque for actuating the electric motor of the power-assisted steering system according to the invention.

FIG. 6 depicts another embodiment of the invention wherein the use of a torque sensor for sensing the hand torque of the driver $M_{driver}$ is omitted. The torque of the torsion rod of the steering system that is necessary for the torque superposition function is reconstructed. A determined or estimated hand torque of the driver $M_{Dr,mean}$ 51 is used instead of the torque $M_{driver}$ 31 to be applied by the driver as an input quantity in FIG. 5, in addition to the torque $M_{Dr,max}$ 52 that is maximally applicable by the driver, the vehicle speed $V_{veh}$ 53, the control variable ST 54 that is directly or indirectly predefinable by the driver.

A scaling factor λ 57, corresponding to an amplification factor V (V=1/λ) is determined in the determination unit 55 on the basis of the vehicle speed $V_{veh}$ 53 and the control variable ST 54 according to a preferably predetermined or predeterminable function 56.

A maximum scaling factor $\lambda_{max}$ is determined 60 from the established or estimated hand torque of the driver $M_{Dr,mean}$ 51 and the torque $M_{Dr,max}$ 52 maximally applicable by the driver. Said value is used as input quantity 59 for the limiter function 58. This limitation of the scaling factor λ by said function 58 prevents that the torque $M_{Dr,max}$ 52 rises excessively and, as the case may be, uncontrolledly, in the event of a scaling factor λ higher than 'one' (λ>1) and, hence, an amplification factor V lower than 'zero' (V<0).

For standardization purposes, the so determined scaling factor λ 61 is deducted from the value 'one' (1−$\lambda_{mod}$) 62 and the so standardized value (1−$\lambda_{mod}$) 63 is superimposed 64 on the determined or estimated value $M_{Dr,mean}$ 51 for the torque applicable by the driver.

The variable torque $M_{CF,0}$ 66 independent of the driver is superimposed 67 in addition, as the case may be, to the superimposed torque 65, in particular for the purpose of center displacement. The result is the output value for the superposition torque $M_{Mot}$ 68.

Figure 7:
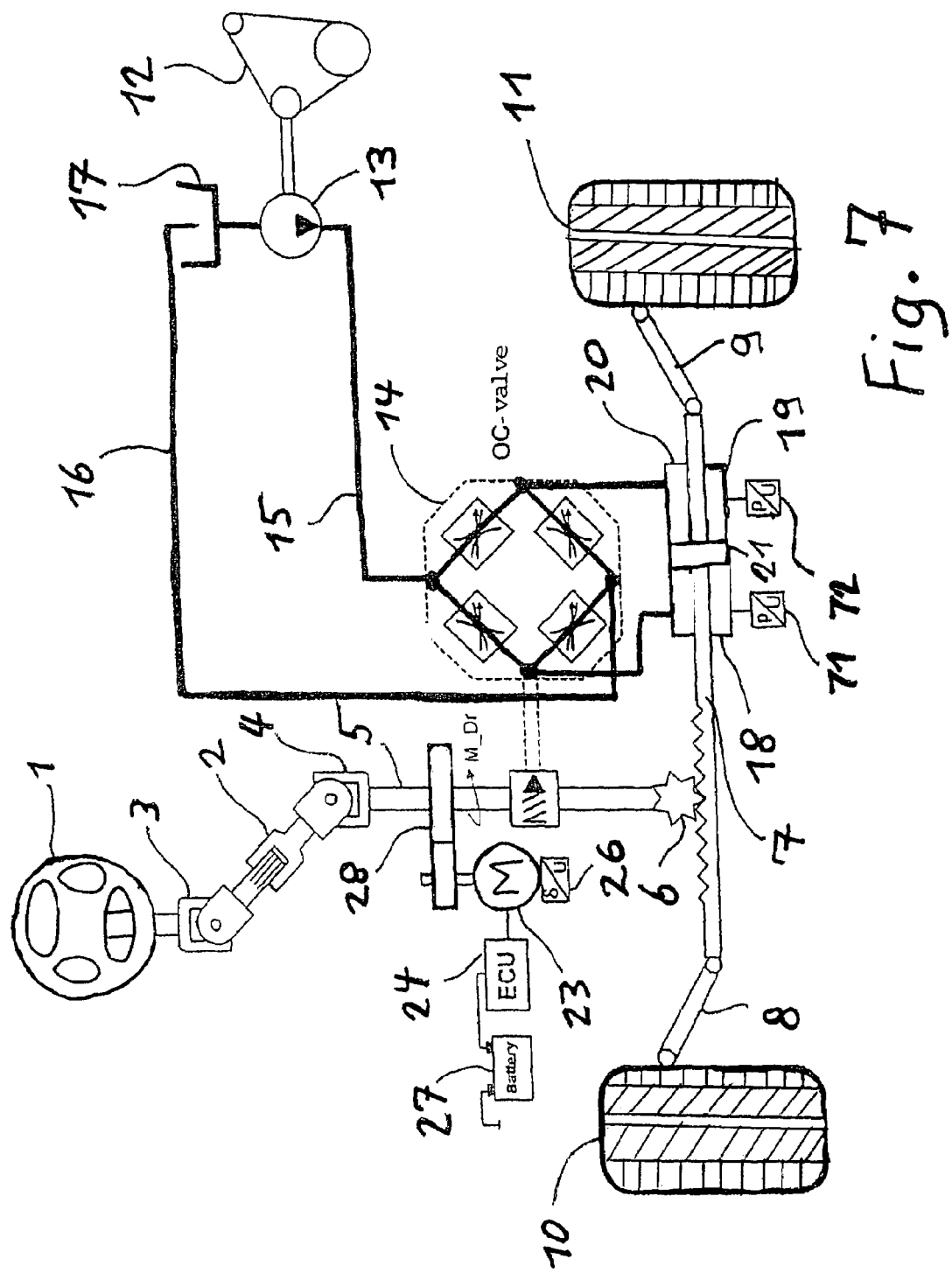
FIG. 7 is a schematic view of a second embodiment of the power-assisted steering system of the invention comprising an electromechanical actuator and the determination of the torque at the torsion rod on the basis of signals of pressure sensors in the working chambers of the power-assisted steering system.

FIG. 7 illustrates a second embodiment of the power-assisted steering system of the invention comprising an electromechanical actuator, wherein a torque at the torsion rod 5 is determined on the basis of signals of pressure sensors 71, 72 in the hydraulic working chambers 18, 19 of the power-assisted steering system. The basic steering system with hydraulic assistance is identical with the system shown in FIG. 1 and, therefore, will not be explained in detail.

Figure 8:
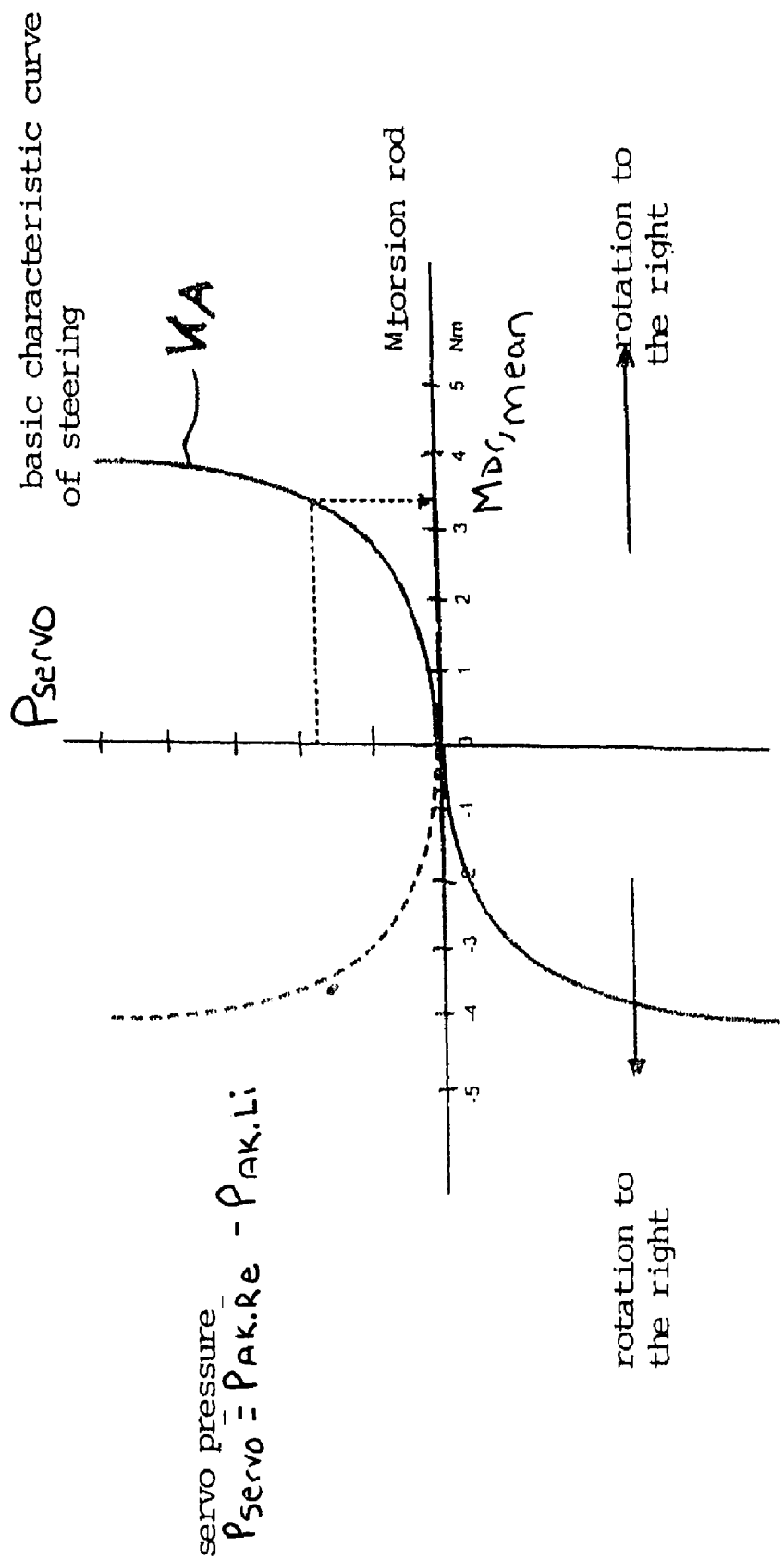
FIG. 8 illustrates the determination of the torque at the torsion rod on the basis of a determined hydraulic pressure in the working chambers of the power-assisted steering system.

FIG. 8 displays the determination of the torque at the torsion rod on the basis of a determined hydraulic pressure in the working chambers of the power-assisted steering system. The (hydraulic) servo pressure $P_{servo}$ results from the difference between the hydraulic pressure in the right working chamber $P_{WC,right}$ and in the left working chamber $P_{WC,left}$ ($P_{servo}=P_{WC,right}-P_{WC,left}$). The corresponding characteristic curve of the basic steering function is plotted as solid curve $K_A$ in FIG. 8. An associated torque $M_{Dr,mean}$ at the torsion rod can be determined from a defined value for the servo pressure $P_{Servo}$, herein e.g. $P_M$ in FIG. 8, by way of the characteristic curve $K_A$. The dotted curve represents the above-described (see FIG. 2) characteristic curve with a positive servo pressure for a rotation to the right (right-hand half) and a rotation to the left (left-hand half). It therefore corresponds to the amount of the measured difference in pressure $P_{WC,right}-P_{WC,left}$.

Figure 9:
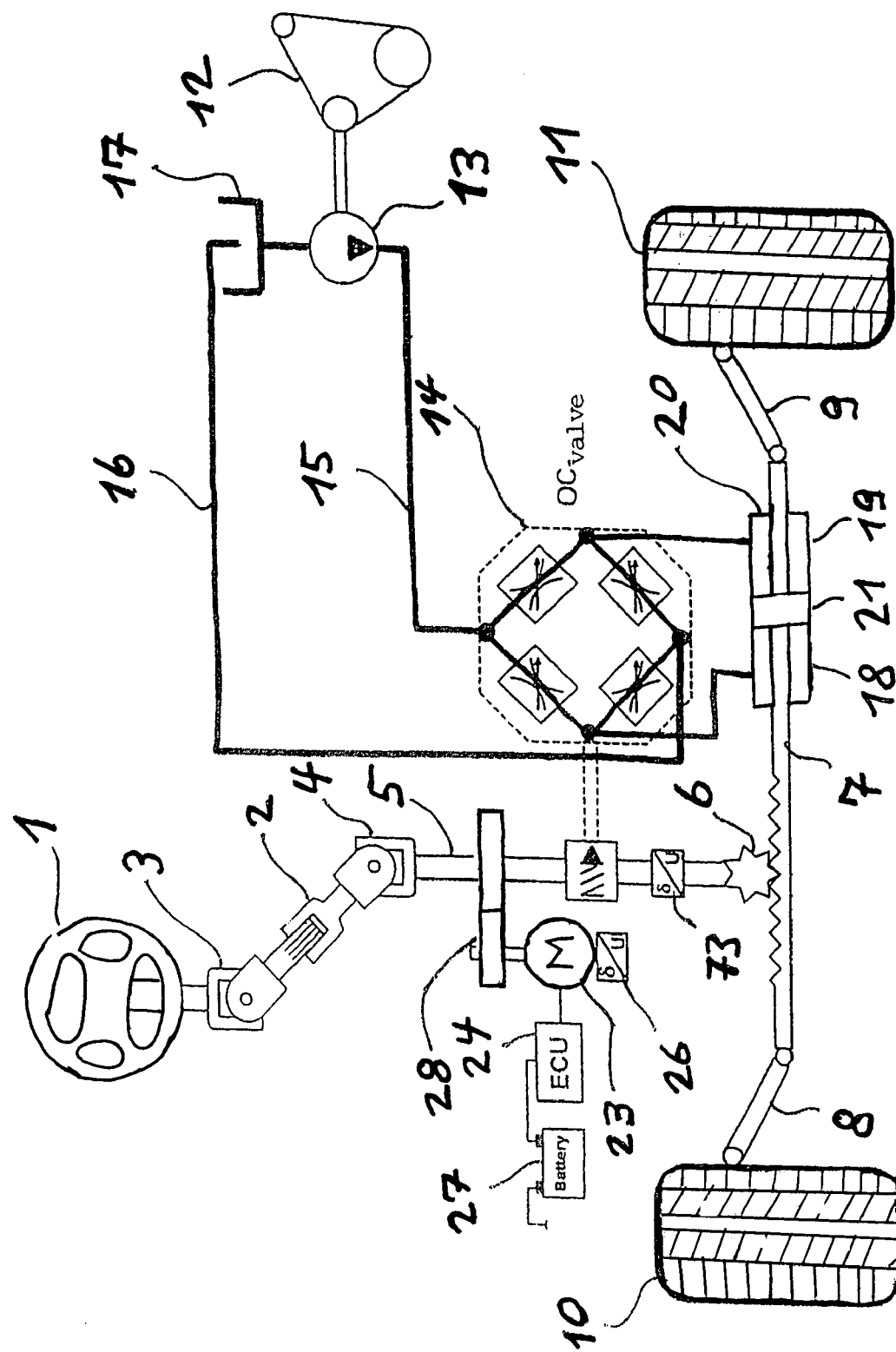
FIG. 9 is a schematic view of a third embodiment of the power-assisted steering system of the invention comprising an electromechanical actuator and for the determination of the torque at the torsion rod on the basis of signals of sensors for determining the angle of rotation at the motor and at the steering wheel shaft of the power-assisted steering system.

FIG. 9 represents a third embodiment of the power-assisted steering system of the invention comprising an electromechanical actuator and the determination of the torque at the torsion rod on the basis of signals from the sensors determining the angle of rotation at the motor 26 (motor angle $\phi_{Mot}$) and another sensor determining the angle of rotation 73 at the steering wheel shaft (pinion angle $\delta_T$) of the power-assisted steering system. The basic steering system with hydraulic assistance is identical with the system shown in FIG. 1 and, therefore, will not be explained in detail. The torque at the torsion rod 5 is determined by measuring the difference of angles on the basis of the measuring signals of the sensors 26, 73.

To this end, the steering wheel angle $\delta_H$ is derived from the motor angle $\phi_{Mot}$ according to the relation $\delta_H=v*\phi_{Mot}$. The torque at the torsion rod $M_{Dr}$ or $M_{torsion\ rod}$ is then determined by means of the known rigidity of the torsion rod 5 $C_T$ and the measured difference of angles according to the relation $M_{Dr,mean}=C_T*(\delta_H-\delta_T)$

The invention claimed is:

1. A hydraulic power-assisted steering system comprising a steering gear and a hydraulic actuator assisting actuation of a steering wheel by a driver of a vehicle, comprising an electric motor which is coupled to the steering column and used as an additional torque actuator for actively applying an additional steering torque, also comprising an electronic control and regulating unit (ECU), wherein the electronic control and regulating unit (ECU) includes a determination unit determining a steering torque and an evaluating and selecting circuit, by means of which a total value for applying the additional steering torque is determined in consideration of the determined steering torque or a quantity derived therefrom and a selected basic characteristic curve of steering (basic characteristic curve), and the total value of the additional steering torque to be applied includes a driver-dependent component and a driver-independent component.

2. Power-assisted steering system as claimed in claim 1, wherein different predetermined characteristic curves can be selected for varying the application of the additional steering torque.

3. Power-assisted steering system as claimed in claim 1, wherein the characteristic curve represents a characteristic curve of amplification conveying the additional steering torque to be applied in dependence on the steering torque applied by the driver and on an amplification factor.

4. Power-assisted steering system as claimed in claim 1, wherein different predetermined characteristic curves for the variation of the application of the additional steering torque can be selected by way of a control variable ST that is directly or indirectly predefinable by the driver.

5. Power-assisted steering system as claimed in claim 1, wherein the electronic control and regulating unit (ECU) is designed redundantly.

6. Power-assisted steering system as claimed in claim 1, wherein the electric motor is coupled to the steering column by way of a gear.

7. Power-assisted steering system as claimed in claim 1, wherein the amplification factors of the different characteristic curves are variable in response to the vehicle speed determined by a speed sensor on the vehicle.

8. Power-assisted steering system as claimed in claim 1, wherein a steering recommendation is given to the driver by means of the driver-independent component.

9. Power-assisted steering system as claimed in claim 1, wherein the vehicle is stabilized and the vehicle dynamics is enhanced, respectively, by means of the driver-independent component.

10. Power-assisted steering system as claimed in claim 1, wherein the additional steering torque is adapted to a vehicle course and a roadway course by means of the driver-independent component.

11. Power-assisted steering system as claimed in claim 1, wherein the variations of the additional steering torque are effected by using a scaling factor $\lambda$ or an amplification factor V, respectively, according to the relation $V=1/\lambda$.

12. Power-assisted steering system as claimed in claim 1, the power-assisted steering system further comprising the variations of the additional steering torque are effected by using a scaling factor X or an amplification factor V, respectively, according to the relation $V=1/\lambda$, wherein the scaling factor X or amplification factor V (where $V=1/\lambda$) is limited to a predefined value in a torque-dependent fashion.

13. Power-assisted steering system as claimed in claim 1, wherein the electric motor and ECU are designed as a unit that is arranged as a module at a steering-wheel-side end portion of the steering valve of a hydraulic power-assisted steering system.

* * * * *